United States Patent
Hansen (10) Patent No.: US 7,795,547 B2
(45) Date of Patent: Sep. 14, 2010

(54) METHOD OF WEIGHT DETERMINATION OF A LOAD CARRIED BY A LIFTER OF A LIFTING DEVICE AND WEIGHING DEVICE

(76) Inventor: Torben Winther Hansen, Buen 16, DK-3720 Aakirkeby (DK)

( * ) Notice: Subject to any disclaimer, the term of this patent is extended or adjusted under 35 U.S.C. 154(b) by 244 days.

(21) Appl. No.: 11/916,350

(22) PCT Filed: Jun. 3, 2005

(86) PCT No.: PCT/DK2005/000369

§ 371 (c)(1),
(2), (4) Date: Jul. 3, 2008

(87) PCT Pub. No.: WO2006/128454

PCT Pub. Date: Dec. 7, 2006

(65) Prior Publication Data

US 2008/0314649 A1    Dec. 25, 2008

(51) Int. Cl.
G01G 9/00 (2006.01)
G01G 19/10 (2006.01)
(52) U.S. Cl. .......................... 177/1; 177/141; 177/146; 702/101
(58) Field of Classification Search ................. 177/141, 177/146, 1; 701/50; 702/101, 102
See application file for complete search history.

(56) References Cited

U.S. PATENT DOCUMENTS

| 4,807,136 | A | * | 2/1989 | Rutkowski et al. ............ 701/50 |
|---|---|---|---|---|
| 4,942,529 | A | * | 7/1990 | Avitan et al. ................... 701/50 |
| 4,995,468 | A | * | 2/1991 | Fukuda ........................ 177/139 |
| 5,067,572 | A | * | 11/1991 | Kyrtsos et al. ............... 177/139 |
| 5,178,226 | A | * | 1/1993 | Bowman et al. ............. 177/139 |
| 5,509,293 | A | * | 4/1996 | Karumanchi ................ 177/139 |
| 5,666,295 | A |   | 9/1997 | Bruns |
| 5,929,389 | A | * | 7/1999 | Keuper ........................ 177/141 |
| 6,175,796 | B1 | * | 1/2001 | Ishikawa ...................... 701/50 |
| 6,232,566 | B1 |   | 5/2001 | Bruns |
| 6,266,594 | B1 | * | 7/2001 | Ishikawa ..................... 177/141 |
| 6,552,279 | B1 | * | 4/2003 | Lueschow et al. ........... 177/141 |
| 7,480,579 | B2 | * | 1/2009 | Lueschow et al. ........... 702/101 |

FOREIGN PATENT DOCUMENTS

| DE | 38 20 757 A1 | 12/1989 |
|---|---|---|
| DE | 43 28 144 A1 | 2/1995 |
| DE | 43 28 148 A1 | 2/1995 |

* cited by examiner

*Primary Examiner*—Randy W Gibson
(74) *Attorney, Agent, or Firm*—Foley & Lardner LLP (57) ABSTRACT

A method of weight determination of a load carried by a lifter (1) of a lifting device (2) is based on at least one upward and one downward displacement of the lifter (1) by means of a hydraulic actuator (7). A pressure signal is provided by means of a pressure transducer (24), and a position signal is provided by means of a meter (23). The weight of the load (27) is determined on the basis of the pressure signal (24) and the position signal (23). The position signal is registered as a function of time, an acceleration dependent parameter is determined on the basis of the variation of the position signal, and the weight determination is performed in dependence of said acceleration dependent parameter. Furthermore, a weighing device is disclosed.

23 Claims, 6 Drawing Sheets

Summary of formulae

Load mass $m_l$, equation (7):

$$m_l = \frac{A \cdot \left(\dfrac{p_o - p_r}{g + 2a_o} + \dfrac{p_n + p_r}{g + 2a_n}\right) - (m_{oo} + m_{on}) - (m_{co} + m_{cn}) - \mu \cdot (m_{co} - m_{cn}) - \left(\dfrac{m_s + m_k}{2} + m_g\right)}{4}$$

Equivalent mass constant for the lifting device $m_a$, equation (8):

$$m_a = \frac{A \cdot \left(\dfrac{p_o - p_r}{g + 2a_o} + \dfrac{p_n + p_r}{g + 2a_n}\right) - (m_{oo} + m_{on}) - (m_{co} + m_{cn}) - \mu \cdot (m_{co} - m_{cn})}{4} - \frac{m_s + m_k}{2} + m_g$$

Coefficient of friction $\mu$ when $m_{co} = m_{cn}$, equation (16):

$$\mu = \frac{\dfrac{p_o - p_r}{g + 2a_o} - \dfrac{p_n + p_r}{g + 2a_n}}{\dfrac{p_o - p_r}{g + 2a_o} + \dfrac{p_n + p_r}{g + 2a_n}} - \frac{m_{oo} + m_{on}}{A}$$

Coefficient of friction $\mu$ when $m_{co} \neq m_{cn}$, equation (17):

$$\mu = \frac{A \cdot \left[\dfrac{p_o - p_r}{g + 2a_o} + \dfrac{p_n + p_r}{g + 2a_n}\right] - (m_{oo} + m_{on}) - \sqrt{\left(A \cdot \left[\dfrac{p_o - p_r}{g + 2a_o} + \dfrac{p_n + p_r}{g + 2a_n}\right] - (m_{oo} + m_{on})\right)^2 - 4 \cdot (m_{co} - m_{cn}) \cdot \left(A \cdot \left[\dfrac{p_o - p_r}{g + 2a_o} - \dfrac{p_n + p_r}{g + 2a_n}\right] - (m_{oo} - m_{on}) - (m_{co} - m_{cn})\right)}}{2 \cdot (m_{co} - m_{cn})}$$

Fig. 9

Summary of formulae

Piston area A, equation (13):

$$A = \frac{2 + \left[\dfrac{m_{oo} - m_{coz}}{2m_l + m_{co} - m_{coz}}\right] + \left[\dfrac{m_{on} - m_{onz}}{2m_l + m_{cn} - m_{cnz}}\right]}{\left[\dfrac{\dfrac{p_o - p_r}{g + 2a_o} - \dfrac{p_{oz} - p_{rz}}{g + 2a_{oz}}}{2m_l + m_{co} - m_{coz}}\right] + \left[\dfrac{\dfrac{p_n - p_r}{g + 2a_n} - \dfrac{p_{nz} - p_{rz}}{g + 2a_{nz}}}{2m_l + m_{cn} - m_{cnz}}\right]}$$

Alternative method for determining load mass $m_l$ in case of lifting, equation (18):

$$m_l = \frac{\dfrac{(p_o - p_r) \cdot A}{1 + \mu} - \left(\dfrac{m_{oo}}{1 + \mu} + m_s + m_{bo}\right) \cdot (g + a_o)}{2 \cdot (g + 2a_o)} - m_g - m_{co}$$

Alternative method for determining load mass $m_l$ in case of lowering, equation (19):

$$m_l = \frac{\dfrac{(p_n + p_r) \cdot A}{1 - \mu} - \left(\dfrac{m_{on}}{1 - \mu} + m_s + m_{bn}\right) \cdot (g + a_n)}{2 \cdot (g + 2a_n)} - m_g - m_{cn}$$

Fig. 10

METHOD OF WEIGHT DETERMINATION OF A LOAD CARRIED BY A LIFTER OF A LIFTING DEVICE AND WEIGHING DEVICE

The present invention relates to a method of weight determination of a load carried by a lifter of a lifting device, whereby the weight determination is based on at least one upward and one downward displacement of the lifter, whereby the lifter is displaced by means of a hydraulic actuator comprised by a hydraulic system, whereby, during the upward and downward displacement of the lifter, a pressure in the hydraulic system is measured by means of a pressure transducer, thereby providing a pressure signal, and a parameter dependent on the position of the lifter is measured by means of a meter, thereby providing a position signal, and whereby the weight of the load is determined on the basis of the pressure signal and the position signal.

DE 38 20 757 A1 describes a method and device for weight determination of a load carried by a three-point hitch of a tractor. The weight determination is based on a pressure signal from a pressure transducer in the hydraulic system of the three-point hitch and a position signal from a position sensor registering the position of the three-point hitch. The measurements are performed by lifting and lowering the three-point hitch by a small distance about a predetermined measurement position in which the dependence of the measured signals on the distance to the centre of gravity of the load is small and the proportionality of the pressure signal is large. Thereby, the contribution to the weighing result of the hysteresis caused by friction may be reduced. During the measurement operation, the hydraulic actuator of the three-point hitch is driven to-and-fro at a constant, relatively small speed, in order to minimise dynamic pressure contributions to the weighing result. However, this device requires a complicated hydraulic valve system adapted to operate the hydraulic actuator at constant speed and is therefore expensive. Furthermore, the weight determination has to be performed in a predetermined position of the three-point hitch, which may be a disadvantage.

DE 43 28 148 A1 also describes a method and device for weight determination of a load carried by a three-point hitch of a tractor, whereby a pressure signal and a position signal are provided as in the above-described device. A global coefficient of friction for a certain three-point hitch is determined on the basis of measured pressure signals during a lifting and lowering operation of the three-point hitch carrying a random load, whereby said pressure signals are measured in a certain height of the lift. Subsequently, a transfer constant for said three-point hitch is calculated on the basis of the determined global coefficient of friction together with a pressure signal measured at lifting or lowering of a known load on the hitch. During operation of the weighing device, the weight of a load on the hitch may be determined from a pressure signal measured at lifting or lowering of the hitch and on the basis of the determined global coefficient of friction and transfer constant for the hitch. The global coefficient of friction and transfer constant may also initially be determined as a function of the height position of the hitch, so that a load subsequently may be weighed at any height position of the hitch. However, according to this device, the hydraulic actuator must also be operated at constant speed in order to minimise dynamic pressure contributions to the weighing result, and a complicated and therefore expensive hydraulic valve system is required.

U.S. Pat. No. 5,929,389 further describes a method and device for weight determination of a load carried by a lifting device, whereby a pressure signal and a position signal are provided as in the above-described devices. During a measurement operation, the lifting device moves up and down with a generally fixed speed, and sets of values of the pressure signal and the position signal are registered by a processor means in at least two different positions of the lifting device. Subsequently the processor means determines the weight of the load from the registered sets of values and from predetermined geometric dimensions of the link device by means of an equation for equilibrium of forces and torque acting on a link member. However, this device also requires an expensive constant speed valve system.

The object of the present invention is to provide a method of weight determination that may be realized with a device of simple structure.

In view of this object, the position signal is registered as a function of time, an acceleration dependent parameter is determined on the basis of the variation of the position signal, and the weight determination is performed in dependence of said acceleration dependent parameter.

In this way, a weighing operation may be performed by upward and downward displacement of the lifter without having to maintain a constant speed of the hydraulic cylinder or the lifter, because the weight determination is performed in dependence of an acceleration dependent parameter; in other words, forces resulting from the possible acceleration of the load and elements of the lifting device during the weighing operation are taken into account when determining the weight of the load. Consequently, a system of mechanically simple structure may be employed to realize the method of weight determination according to the invention.

In an advantageous embodiment, the pressure signal is registered as a function of time, a velocity dependent parameter is determined as a function of time on the basis of the variation of the position signal, a point in time during the upward displacement of the lifter is selected, and a point in time during the downward displacement of the lifter is selected, so that the values of the velocity dependent parameter to the respective selected points in time are substantially equal, and the weight determination is performed in dependence of the values of the pressure signal registered to the respective selected points in time and in dependence of the values of the acceleration dependent parameter determined for the respective selected points in time. Thereby, velocity dependent viscous friction forces of the lifting device having opposite direction by upward and downward displacement of the lifter, respectively, may be substantially balanced, because the weight determination is based on measurements performed at equal, but opposite, velocities of the lifter. Consequently, the result of the weight determination may be substantially independent of such velocity dependent viscous friction forces and therefore more precise.

In an embodiment, the weight determination is performed in dependence of the values of the position signal registered to the respective selected points in time. Thereby, the geometric weight distribution of the lifting device and the load carried by the lifter may be taken into account at the weight determination, and the result thereof may consequently be more precise.

In an embodiment, the weight determination is performed in dependence of the values of the velocity dependent parameter determined for the respective selected points in time. In this way, furthermore, velocity dependent parameters may be taken into account when determining the weight of the load. Such parameters may include loss of head by friction in pipes of the hydraulic system, because the flow rate of hydraulic fluid to and from the hydraulic actuator in the hydraulic system depends on the velocity of the piston in the cylinder of the hydraulic actuator.

In an advantageous embodiment, during one upward and one downward displacement of the lifter, the velocity and the acceleration of the lifter are determined on the basis of the variation of the position signal and presented to a user in real time via an output device, the user operates by means of a hydraulic valve the lifter to maintain the velocity substantially within a certain range and the acceleration substantially below a certain limit, two periods of time during said one upward and said one downward displacement of the lifter, respectively, are determined, during which periods of time the determined velocity is within said range, and the determined acceleration is below said limit, and the weight of the load is determined on the basis of average values of the acceleration and pressure signals during said periods of time, respectively. Because the velocity and acceleration thereby are limited during the measurement operation, the requirements made of a processor adapted to perform the weight determination may be less. For instance, if the position signal and pressure signal are sampled by a computer, a smaller sampling frequency may be employed. Thereby, a less expensive computer may be necessary.

In an embodiment, the weight of the load is determined on the basis of average values of the position signal during said periods of time, respectively. Thereby, the geometric weight distribution of the lifting device and the load carried by the lifter may be taken into account at the weight determination, and the result thereof may consequently be more precise.

In an embodiment, the weight of the load is determined on the basis of average values of the velocity signal during said periods of time, respectively. In this way, furthermore, velocity dependent parameters, as mentioned above, may be taken into account when determining the weight of the load.

In an advantageous embodiment, a general coefficient of friction of the lifting device is determined on the basis of one upward and one downward displacement of the lifter carrying the load to be weighed, and the weight determination is based on the determined general coefficient of friction. As the friction of a lifting device may change over time due to factors such as wear and changing lubrication conditions, and furthermore may depend on the weight of the load lifted by the lifter, the determination of a general coefficient of friction of the lifting device on the basis of displacements of the lifter carrying the actual load to be weighed will result in a much more precise weight determination than if such a coefficient of friction were determined only once for the lifting device by displacement of an arbitrary load and used for every subsequent weight determination.

In an embodiment, the position signal is provided by means of a flowmeter measuring the flow of hydraulic fluid through a pipe for the hydraulic actuator. Thereby, a precise position signal may be obtained in a simple and economic way. Furthermore, a flowmeter may easily be installed in an existing lifting device by insertion in a pipe for the hydraulic actuator.

In an advantageous embodiment, signals from the pressure transducer and from the meter providing the parameter dependent on the position of the lifter are registered as sampled values in a computer, and the computer calculates the position signal and the pressure signal on the basis thereof and determines the weight of the load on the basis thereof.

In an embodiment, a weighing operation is automatically performed by means of a processor upon initiation by the user, whereby the hydraulic actuator is controlled by the processor to displace the lifter once in upward direction and once in downward direction. Thereby, the weighing operation is facilitated because less interaction with the user is required.

The invention further relates to a weighing device for weight determination of a load carried by a lifter of a lifting device, the lifter being displaceable by means of a hydraulic actuator comprised by a hydraulic system of the lifting device, the weighing device comprising a processor adapted to determine the weight on the basis of at least one upward and one downward displacement of the lifter, a pressure transducer adapted to measure a pressure in the hydraulic system of the lifting device and thereby provide a pressure signal, and a meter adapted to measure a parameter dependent on the position of the lifter of the lifting device and thereby provide a position signal, and the processor being adapted to determine the weight of the load on the basis of a pressure signal and a position signal supplied from the pressure transducer and the meter, respectively, during the upward and downward displacement of the lifter.

The system is characterized in that the processor is adapted to register the position signal as a function of time, to determine an acceleration dependent parameter on the basis of the variation of the position signal, and to determine the weight in dependence of said acceleration dependent parameter. Thereby, the above-mentioned advantages are obtained.

In an advantageous embodiment, the processor is adapted to register the pressure signal as a function of time, to determine a velocity dependent parameter as a function of time on the basis of the variation of the position signal, to select a point in time during the upward displacement of the lifter and select a point in time during the downward displacement of the lifter, so that the values of the velocity dependent parameter to the respective selected points in time are substantially equal, and to perform the weight determination in dependence of the values of the pressure signal registered to the respective selected points in time and in dependence of the values of the acceleration dependent parameter determined for the respective selected points in time. Thereby, the above-mentioned advantages are obtained.

In an embodiment, the processor is adapted to perform the weight determination in dependence of the values of the position signal registered to the respective selected points in time. Thereby, the above-mentioned advantages are obtained.

In an embodiment, the processor is adapted to perform the weight determination in dependence of the values of the velocity dependent parameter determined for the respective selected points in time. Thereby, the above-mentioned advantages are obtained.

In an advantageous embodiment, the processor is adapted to determine, during one upward and one downward displacement of the lifter, the velocity and the acceleration of the lifter on the basis of the position signal, the weighing device comprises an output device adapted to present the determined velocity and acceleration to a user in real time, the processor is adapted to guide the user, via the output device, to operate the lifter to maintain the velocity substantially within a certain range and the acceleration substantially below a certain limit, the processor is adapted to determine two periods of time during said one upward and said one downward displacement of the lifter, respectively, during which periods of time the determined velocity is within said range, and the determined acceleration is below said limit, and the processor is adapted to determine the weight of the load on the basis of average values of the acceleration and pressure signals during said periods of time, respectively. Thereby, the above-mentioned advantages are obtained.

In an embodiment, the processor is adapted to determine the weight of the load on the basis of average values of the position and velocity signals during said periods of time, respectively. Thereby, the above-mentioned advantages are obtained.

In an embodiment, the processor is adapted to determine a general coefficient of friction of the lifting device on the basis of one upward and one downward displacement of the lifter carrying the load to be weighed, and to determine the weight on the basis of the determined general coefficient of friction. Thereby, the above-mentioned advantages are obtained.

In an embodiment, a flowmeter is provided to measure the flow of hydraulic fluid through a pipe for the hydraulic actuator and thereby provide the position signal. Thereby, the above-mentioned advantages are obtained.

In an advantageous embodiment, the weighing device comprises a unit having a through-going tube part adapted to be fitted in-line in the pipe for the hydraulic actuator of the lifting device, and the flowmeter and the pressure transducer are integrated in the unit and arranged to measure the flow through and the pressure in, respectively, the tube part. Thereby, the installation of the weighing device in a lifting device is greatly facilitated, because only said unit has to be mounted and no separate transducers have to be built into the lifting device at various positions, such as for instance in the hydraulic cylinder.

In an advantageous embodiment, the processor is a computer adapted to register, as sampled values, signals from the pressure transducer and from the meter providing the parameter dependent on the position of the lifter, and the computer is adapted to calculate the position signal and the pressure signal on the basis of the registered signals from the pressure transducer and from the meter and to determine the weight of the load on the basis thereof. Thereby, the above-mentioned advantages are obtained.

In an embodiment, the processor is adapted to automatically perform a weighing operation upon initiation by the user, whereby the hydraulic actuator is controlled by means of the processor to displace the lifter once in upward direction and once in down-ward direction. Thereby, the above-mentioned advantages are obtained.

The invention further relates to a lifting device comprising a weighing device as described above.

In an embodiment, the lifting device is a fork-lift truck.

The invention will now be explained in more detail below by means of examples of embodiments with reference to the very schematic drawing, in which

DETAILED DESCRIPTION OF THE DRAWINGS

Figure 1:
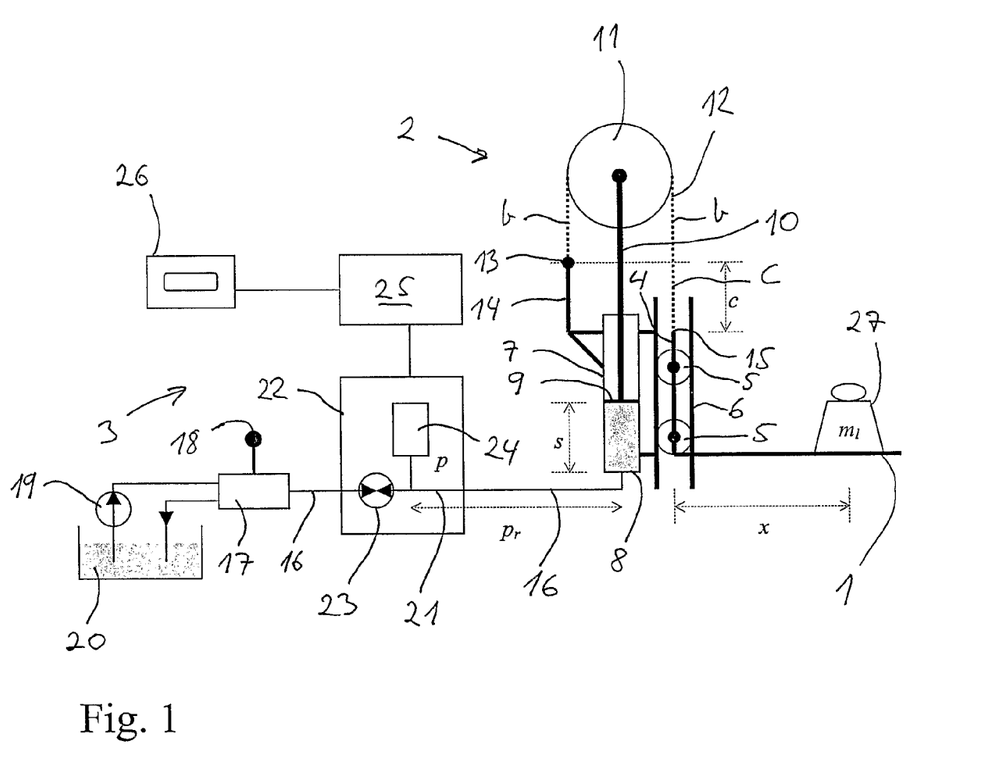
FIG. 1 shows a diagram of a weighing device according to the invention, installed in a lifting device.

FIG. 1 indicates a lifter 1 of a lifting device 2 provided with a weighing device 3 according to the invention. In the embodiment shown, the lifting device 2 has the form of a fork-lift truck, which is only partly shown. The lifter 1 is constituted by a fork and arranged displaceable in the vertical direction by means of a carriage 4 provided with rollers 5 rolling between opposed vertical faces of a pole 6 in a manner known per se. The lifter 1 is driven by means of a hydraulic actuator 7 in the form of a vertical cylinder 8 in which a piston 9 is displaceable. The piston 9 is mounted on a piston rod 10, the upper end of which carries a chain roller 11. A chain 12 is fixed at a first end 13 thereof to a fixed frame 14 of the lifting device 2, passes over the chain roller 11 and is fixed at a second end 15 thereof to the carriage 4. Consequently, a displacement of the piston 9 by a certain velocity in the cylinder 8 causes a displacement of the carriage 4 and therefore the lifter 1 by twice said velocity. For calculation purposes, a first portion of the chain 12 is designated b and has the length b, and a second portion of the chain 12 is designated c and has the length c, whereby the length of each chain portion b, c varies with the height position of the carriage 4 as indicated in FIG. 1.

The hydraulic actuator 7 is actuated by means of hydraulic fluid supplied and discharged through a pipe 16 connected with a hydraulic valve 17 that may be operated by means of a handle 18 in order to supply hydraulic fluid from a hydraulic pump 19 to the pipe 16 or to discharge hydraulic fluid from the pipe 16 to a reservoir 20, whereby the lifter 1 is lifted or lowered, respectively.

In the pipe 16, a tube part 21 is fitted in-line and arranged through a unit 22 comprising a flowmeter 23 adapted to measure the flow through the tube part 21 and a pressure transducer 24 adapted to measure the pressure in the tube part 21.

The unit 22 is connected with a computer 25 adapted to perform a weight determination on the basis of sampled values of the signals received from the flowmeter 23 and the pressure transducer 24 in the unit 22. The computer 25 is connected with an output device 26 adapted to present determined values to a user. The weighing device 3 comprises the unit 22, the computer 25, the output device 26 and a not shown input device by means of which the computer 25 may be manipulated. However, the weighing device 3 may instead of being supplied with its own input/output devices have an interface adapted to be connected with input/output devices pertaining to the lifting device 2.

The principle of balanced mass determination is based on the ability to balance measuring errors caused by frictions in the mechanical lifting device. This may be achieved by allowing the lifter, on which a load 27 is located, to perform an upwardly directed and a subsequent downwardly directed movement.

Since the forces required to lift the load 27 equal the sum of the gravitational and frictional forces, the sum of forces during a downwardly directed movement will equal the gravitational forces minus the frictional forces. Half the sum of the upwardly and downwardly directed forces is thus an expression of the load weight without frictional impacts, since these cancel out.

Figure 2:
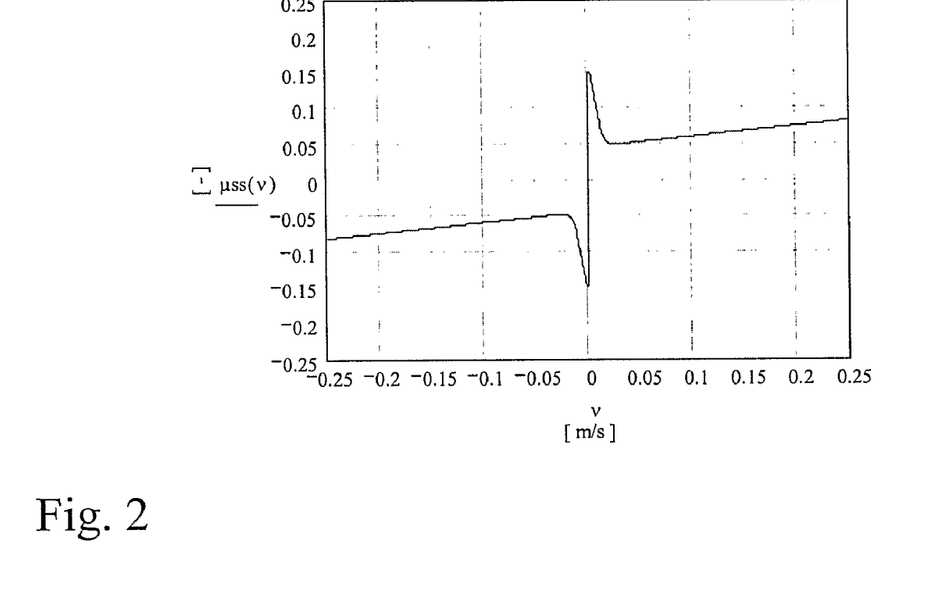
FIG. 2 illustrates an example of a dynamic coefficient of friction and its dependency on the velocity of movement.
Figure 3:
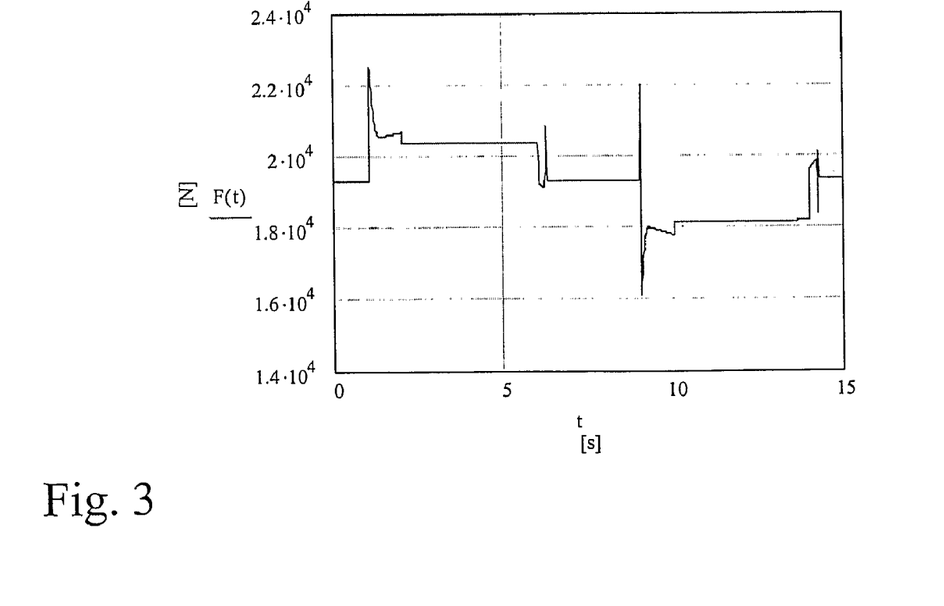
FIGS. 3 to 6 illustrate an example of graphs showing the piston force, acceleration, velocity and position, respectively, as a function of time for a lifting device.
Figure 4:
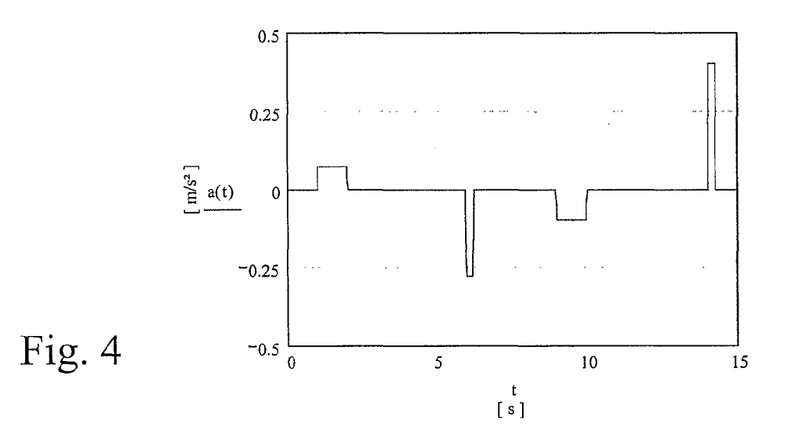
Figure 5:
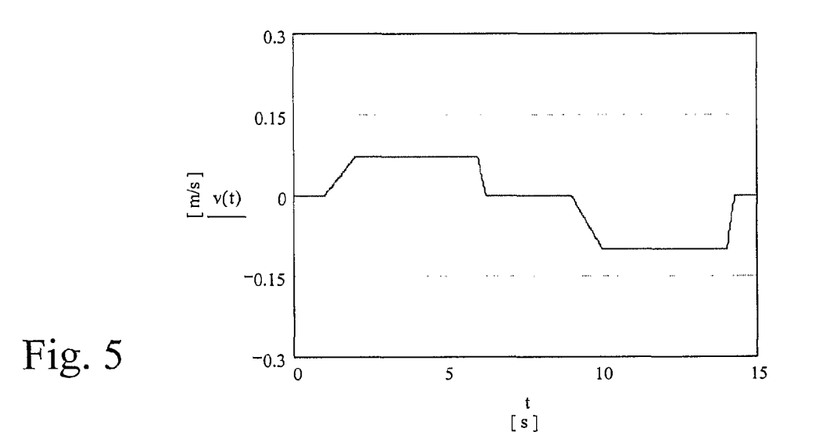
Figure 6:
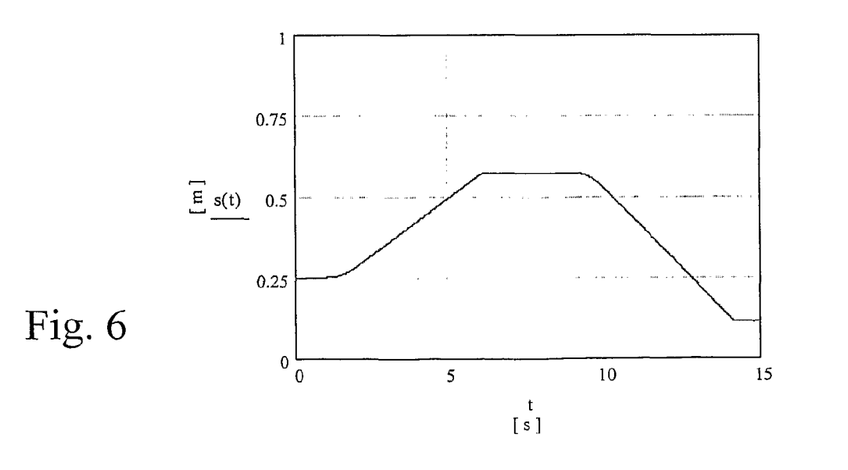

This applies given that frictions in the upward and downward directions are the same, and that no mass acceleration takes place when measuring the forces. By measuring the acceleration, acceleration forces and changed friction conditions caused by Newton's second law on motion may be set off. If, for instance, the chain 12 is charged with a larger force due to acceleration of the lifter 1, the bearing of the chain roller 11 is responding with a larger friction force. In order to ensure equally sized viscous frictions in both directions, the forces are measured at the same upward and downward velocity. In FIG. 2, an example of a dynamic coefficient of friction $\mu ss(v)$ and its dependency on the velocity of movement v is illustrated.

It shows that friction is greatest at rest. This is also called static friction or stiction. In case of increasing velocity, the friction drops dramatically to a level called dynamic dry friction or Coulomb friction, which is independent of the velocity of movement. If the surfaces are lubricated, the friction will increase with the velocity, which is called dynamic wet friction or viscous friction.

Since the mass distribution of the lifting device is changed concurrently with the lifting height, e.g. due to a changed amount of oil in the hydraulic cylinder 8 or a change in the position of the chain 12 around the chain roller 11, the position of the hydraulic piston 9 is measured, because it is possible to determine the changes in mass distribution based on this.

The vertically operating forces and the position of the hydraulic piston 9 may be determined by measuring pressure and flow of hydraulic fluid combined with information on the area of the hydraulic piston 9. Velocity and acceleration are determined by the computer 25 as the first and second time derivative of the position of the piston 9, computed from a sampled position signal provided by means of the flowmeter 23. The position signal may be reset by lowering the fork to ground level. Instead of using a flowmeter, the position signal may also be provided by other known means, for instance a laser distance meter arranged next to the lifter or next to the hydraulic cylinder or an ultrasonic distance meter arranged, for instance, inside the hydraulic cylinder.

The basic physical values measured directly or indirectly are thus:
F the force of the piston [N]
a the acceleration of the piston [m/s$^2$]
v the velocity of the piston [m/s]
s the position of the piston [m]

As an example, if F, a, v and s are considered, as functions of time, a fork-lift truck with the coefficient of friction μss(v) as described above as well as the parameters
A=0.002150 [m$^2$], piston area
k=4.000 [kg/m], chain weight per meter
b+c=2.11 [m], length of chain (chain portion b+c)
c0=1.73 [m], initial chain length c0
$m_s$=100 [kg], mass of piston rod
$m_g$=257.78 [kg], mass of fork
ρ=840 [g/m$^3$], density of oil
$m_l$=670.2 [kg], mass of load
may have graphs with the same appearance as illustrated in the FIGS. 3 to 6.

In the following, it will be demonstrated how suitable equations for the use in a computer program for the weight determination of the load 27 on the lifter 1 of the lifting device 2 may be constructed. The following general designation of parameters is given:
$m_l$=mass of load [kg].
$m_a$=equivalent mass constant for the lifting device [kg].
$m_k$=mass of chain ($m_b$+$m_c$) [kg]
$m_b$=mass of chain portion b [kg].
$m_c$=mass of chain portion c [kg].
$m_g$=mass of forks+carriage [kg].
$m_s$=mass of piston+piston rod+chain roller [kg].
$m_o$=mass of cylinder oil [kg].
μ=coefficient of friction [–].
p=pressure at pressure transducer [pa].
$p_r$=pressure drop from pressure transducer to cylinder [pa].
A=piston area [m$^2$]
g=gravitational acceleration, 9.81 [M/s$^2$] or [N/kg].
x=distance to centre of gravity for load+forks+carriage [m].
F=force on the lower side of piston [N].
$m_v$=$m_s$+$m_b$, mass in pulley mounting, (times 1) [kg]
$m_h$=$m_l$+$m_g$+$m_c$, mass right side of pulley, (times 2) [kg].
$m_e$=error in approximation formula [kg].
s=position of piston rod [m].
v=(ds/dt) velocity of piston rod [m/s].
a=(d$^2$s/dt$^2$) acceleration of piston rod [M/s$^2$]

r=revolutions of flowmeter [r].
z=rotational speed of flowmeter [r/s].
n=rotational acceleration of flowmeter [r/s$^2$].
l=volume per revolution of flowmeter [m$^3$/r].
k=chain weight per meter [kg/m].
ρ=density (rho) of hydraulic oil [kg/m$^3$].
b=length of chain portion b at random piston position s [m].
c=length of chain portion c at random piston position s [m]
c0=measured initial length of chain portion with lowered forks (s=0) [m]
d=loss of head by friction (hydraulic pipe resistance) from pressure transducer to hydraulic cylinder [pa·s/m$^3$].
Q=flow, oil quantity per second [m$^3$/s].

The following designation of parameters is given for upwardly and downwardly directed movement:
$m_{co}$=mass of chain portion c, up [kg].
$m_{cn}$=mass of chain portion c, down [kg].
$m_{bo}$=mass of chain portion b, up [kg].
$m_{bn}$=mass of chain portion b, down [kg].
$m_{oo}$=mass of cylinder oil, up [kg].
$m_{on}$=mass of cylinder oil, down [kg].
$p_o$=pressure at pressure transducer, up [pa].
$p_n$=pressure at pressure transducer, down [pa].
$a_o$=acceleration of piston rod, up [m/s$^2$].
$a_n$=acceleration of piston rod, down [m/s$^2$].
$v_o$=velocity of piston rod, up [m/s].
$v_n$=velocity of piston rod, down [m/s].
$s_o$=position of piston rod, up [m].
$s_n$=position of piston rod, down [m].
$r_o$=revolutions of flowmeter, up [r].
$z_o$=rotational speed of flowmeter, up [r/s].
$n_o$=rotational acceleration of flowmeter, up [r/s$^2$].
$r_n$=revolutions of flowmeter, down [r].
$z_n$=rotational speed of flowmeter, down [r/s].
$n_n$=rotational acceleration of flowmeter, down [r/s$^2$]
$F_o$=force on lower side of piston, up [N].
$F_n$=force on lower side of piston, down [N].
$m_{vo}$=$m_s$+$m_{bo}$, mass left side of pulley, up [kg].
$m_{vn}$=$m_s$+$m_{bn}$, mass left side of pulley, down [kg].
$m_{ho}$=$m_l$+$m_g$+$m_{co}$, mass right side of pulley, up [kg].
$m_{hn}$=$m_l$+$m_g$+$m_{cn}$, mass right side of pulley, down [kg].
$m_{eo}$=error in approximation formula, up [kg].
$m_{en}$=error in approximation formula, down [kg].

The following special designation of parameters (for empty lifter) is given for a determination of the piston area A by calibration.
$m_{coz}$=mass of chain portion c, up [kg]
$m_{cnz}$=mass of chain portion c, down [kg].
$m_{ooz}$=mass of cylinder oil, up [kg].
$m_{onz}$=mass of cylinder oil, down [kg].
$p_{oz}$=pressure at pressure transducer, up [pa].
$p_{nz}$=pressure at pressure transducer, down [pa]
$a_{oz}$=acceleration of piston rod, up [m/s$^2$].
$a_{nz}$=acceleration of piston rod, down [m/s$^2$]
$p_{rz}$=pressure drop from pressure transducer to cylinder [pa].

The following basic equations for the lifting device are given:

---

| | |
|---|---|
| $Q = l \cdot z$ | flow, oil quantity per second [m$^3$/s]. |
| $d = \dfrac{p}{Q}$ | loss of head by friction (hydraulic pipe resistance) [pa·s/m$^3$]. Pressure p and flow Q measured at loosened connection on the cylinder. |

-continued

| | |
|---|---|
| $p_r = \|Q\| \cdot d$ | pressure drop from pressure transducer to cylinder [pa]. |
| $s = \dfrac{l \cdot r}{A}$ | position of piston rod [m]. |
| $v = \dfrac{l \cdot z}{A}$ | velocity of piston rod [m/s] or |
| $v = \dfrac{Q}{A}$ | velocity of piston rod [m/s]. |
| $a = \dfrac{l \cdot n}{A}$ | acceleration of piston rod [m/s$^2$]. |
| $c = c0 - 2 \cdot s$ | length of chain portion c [m]. |
| $m_c = c \cdot k$ | mass of chain portion c [kg]. |
| $m_o = l \cdot r \cdot \rho$ | mass of oil in hydraulic cylinder [kg] or |
| $m_o = s \cdot A \cdot \rho$ | mass of oil in hydraulic cylinder [kg]. |
| $m_a = \dfrac{m_s + m_k}{2} + m_g$ | equivalent mass constant for the lifting device [kg]. |
| $m_s = 2 \cdot (m_a - m_g) - m_k$ | mass of piston + piston rod + chain roller [kg]. |
| $m_k = 2 \cdot (m_a - m_g) - m_s$ | mass of chain [kg] or |
| $m_k = k \cdot (b + c)$ | mass of chain [kg]. |
| $F_o = (p_o - p_r) \cdot A - m_{oo} \cdot (g + a_o)$ | force on lower side of hydraulic piston when lifting [N]. |
| $F_n = (p_n + p_r) \cdot A - m_{on} \cdot (g + a_n)$ | force on lower side of hydraulic piston when lowering [N]. |

Determination of Load Mass $m_l$

In the model of the fork-lift truck, FIG. 1, the upwardly directed force $F_o$ required to lift the piston and masses placed on it is considered, in order to determine the weight of the load mass $m_l$. The force is described as an approximation by the equation $$F_o = [m_{vo} \cdot (g + a_o) + 2m_{ho} \cdot (g + 2a_o)] \cdot (1 + \mu) \tag{1}$$

in which the values of moments of inertia and angular velocities are considered negligible in relation to the equivalent mass constant for the lifting device and possible load. It should be noted, however, that because the above equation is an approximation, it is possible to construct other equations that may equally be employed to yield fully satisfactory results. The mass of "the right side of pulley" may be isolated:

$$m_{ho} = \dfrac{\dfrac{F_o}{1+\mu} - m_{vo} \cdot (g + a_o)}{2 \cdot (g + 2a_o)} \tag{2}$$

Consequently $$m_{ho} = \dfrac{F_o}{2 \cdot (g + 2a_o) \cdot (1 + \mu)} - \dfrac{m_{vo}}{2} + \dfrac{m_{vo} \cdot a_o}{2 \cdot (g + 2a_o)}$$

Since $F_o = (p_o - p_r) \cdot A - m_{oo} \cdot (g + a_o)$, then $$m_{ho} = \dfrac{(p_o - p_r) \cdot A - m_{oo} \cdot (g + a_o)}{2 \cdot (g + 2a_o) \cdot (1 + \mu)} - \dfrac{m_{vo}}{2} + \dfrac{m_{vo} \cdot a_o}{2 \cdot (g + 2a_o)}$$

and consequently $$m_{ho} = \dfrac{(p_o - p_r) \cdot A - m_{oo} \cdot (g + 2a_o)}{2 \cdot (g + 2a_o) \cdot (1 + \mu)} - \dfrac{m_{vo}}{2} + \dfrac{a_o \cdot \left[\dfrac{m_{oo}}{1 + \mu} + m_{vo}\right]}{2 \cdot (g + 2a_o)}$$

In order to achieve a manageable and approximative formula, the last term is discarded, resulting in an error that may be neglected, as will be shown later on:

$$m_{eo} = \dfrac{a_o \cdot \left[\dfrac{m_{oo}}{1 + \mu} + m_{vo}\right]}{2 \cdot (g + 2a_o)} \tag{3}$$

Of course, other approximations than the above are possible.

The approximation formula is in the above case $$m_{ho} = \dfrac{(p_o - p_r) \cdot A - m_{oo} \cdot (g + 2a_o)}{2 \cdot (g + 2a_o) \cdot (1 + \mu)} - \dfrac{m_{vo}}{2}$$

which means that $$\dfrac{(p_o - p_r) \cdot A}{g + 2a_o} = m_{oo} = (2m_l + 2m_g + 2m_{co} + m_s + m_{bo}) \cdot (1 + \mu)$$

Since $m_b + 2m_c = m_k + m_c$, the following equation is produced, which applies to upwardly directed movement of the fork:

$$\dfrac{(p_o - p_r) \cdot A}{g + 2a_o} = m_{oo} + (2m_l + 2m_g + m_s + m_k + m_{co}) \cdot (1 + \mu) \tag{4}$$

Correspondingly, by similar considerations as above, it may be realized that the following equation applies to downwardly directed movement:

$$\dfrac{(p_n + p_r) \cdot A}{g + 2a_n} = m_{on} + (2m_l + 2m_g + m_s + m_k + m_{cn}) \cdot (1 - \mu) \tag{5}$$

It should be noted that in equation (4) and (5), all variables except $p_r$ are calculated with sign.

By considering both upward and downward movement of the fork, the equations (4) and (5) may be summed up:

$$A \cdot \left[ \frac{p_o - p_r}{g + 2a_o} + \frac{p_n + p_r}{g + 2a_n} \right] = \quad (6)$$
$$m_{oo} + (2m_l + 2m_g + m_s + m_k + m_{co}) \cdot (1 + \mu) +$$
$$m_{on} + (2m_l + 2m_g + m_s + m_k + m_{cn}) \cdot (1 - \mu)$$

and the load mass $m_l$ may be isolated, thereby yielding $$m_l = \frac{A \cdot \left[ \frac{p_o - p_r}{g + 2a_o} + \frac{p_n + p_r}{g + 2a_n} \right] -}{4} - \left( \frac{m_s + m_k}{2} + m_g \right) \quad (7)$$
$$\frac{(m_{oo} + m_{on}) - (m_{co} + m_{cn}) - \mu \cdot (m_{co} - m_{cn})}{4}$$

Determination of the Equivalent Mass Constant $m_a$ (0-Calibration)

If the weights of the elements required to calculate the above defined equivalent mass constant $m_a$ for the lifting device are not known, said mass constant may be found by calibration of the weighing device, a so-called 0-calibration. As $m_a$ does not change, this calibration need only be done once for a certain lifting device and may then be used for all subsequent weighing operations. The calibration is carried out by performing a normal weighing operation, which will be described in detail below, but with $m_l=0$, that is, without load on the lifter 1. Thereby, $m_l=0$ is inserted in equation (7), corresponding to empty lifter:

$$0 = \frac{A \cdot \left[ \frac{p_o - p_r}{g + 2a_o} + \frac{p_n + p_r}{g + 2a_n} \right] -}{4} - \left( \frac{m_s + m_k}{2} + m_g \right)$$
$$\frac{(m_{oo} + m_{on}) - (m_{co} + m_{cn}) - \mu \cdot (m_{co} - m_{cn})}{4}$$

For upwardly and downwardly directed movement, the equivalent mass constant $m_a$ for the lifting device is then $$m_a = \frac{m_s = m_k}{2} + m_g \quad (8)$$
$$= \frac{A \cdot \left[ \frac{p_o - p_r}{g + 2a_o} + \frac{p_n + p_r}{g + 2a_n} \right] -}{4}$$
$$\frac{(m_{oo} + m_{on}) - (m_{co} + m_{cn}) - \mu \cdot (m_{co} - m_{cn})}{4}$$

Determination of Piston Area A (Full-Scale Calibration)

If the exact piston area A is not, or not precisely, known, this may be determined more precisely by a so-called full-scale calibration.

By using equation (4) for upwardly directed movement of the lifter twice, with and without $m_l$ (empty lifter), respectively, and then subtracting these, equation (9) below is produced. $\mu$ for the lifting device with and without load are assumed to be equal, and consequently the lifting velocities have to be equal for both the performed lifting operations. The parameters $p_o$, $p_r$, $a_o$, $m_{oo}$, $m_{co}$ apply for movement with $m_l$ on the lifter, whereas $p_{oz}$, $p_{rz}$, $a_{oz}$, $m_{ooz}$, $m_{coz}$ apply for movement without $m_l$ (empty lifter).

$$\frac{(p_o - p_r) \cdot A}{g + 2a_o} - \frac{(p_{oz} - p_{rz}) \cdot A}{g + 2a_{oz}} = \quad (9)$$
$$m_{oo} - m_{ooz} + (2m_l + 2m_g + m_s + m_k + m_{co}) \cdot (1 + \mu) -$$
$$(2m_g + m_s + m_k + m_{coz}) \cdot (1 + \mu)$$

Given that $\mu$ for the lifting device with and without load are equal, moving A outside the brackets, and isolating $(1+\mu)$ as an independent term in order to eliminate $\mu$, the expression can be reduced to $$A \cdot \frac{\frac{p_o - p_r}{g = 2a_o} - \frac{p_{oz} - p_{rz}}{g + 2a_{oz}}}{2m_l + m_{co} - m_{coz}} = \frac{m_{oo} - m_{ooz}}{2m_l + m_{co} - m_{coz}} + (1 + \mu) \quad (10)$$

Correspondingly, by using equation (5) for downwardly directed movement, the following equation is produced:

$$A \cdot \frac{\frac{p_n - p_r}{g + 2a_n} - \frac{p_{nz} - p_{rz}}{g + 2a_{oz}}}{2m_l + m_{cn} - m_{cnz}} = \frac{m_{on} - m_{onz}}{2m_l + m_{cn} - m_{cnz}} + (1 - \mu) \quad (11)$$

The parameters $p_n$, $p_r$, $a_n$, $m_{on}$, $m_{cn}$ apply for movement with $m_l$ on the lifter, whereas $p_{nz}$, $p_{rz}$, $a_{nz}$, $m_{onz}$, $m_{cnz}$ apply for movement without $m_l$ (empty lifter).

In order to eliminate $\mu$, equations (10) and (11) are added:

$$A \cdot \frac{\frac{p_o - p_r}{g + 2a_o} - \frac{p_{oz} - p_{rz}}{g + 2a_{oz}}}{2m_l + m_{co} - m_{coz}} + A \cdot \frac{\frac{p_n - p_r}{g + 2a_n} - \frac{p_{nz} - p_{rz}}{g + 2a_{nz}}}{2m_l + m_{cn} - m_{cnz}} = \quad (12)$$
$$\frac{m_{oo} - m_{ooz}}{2m_l + m_{co} - m_{coz}} + (1 + \mu) + \frac{m_{on} - m_{onz}}{2m_l + m_{cn} - m_{cnz}} + (1 - \mu)$$

Thereby, $\mu$ for the lifting device with and without load and for upward and downward movement of the lifter are assumed to be equal, and consequently the velocities of the lifter have to be equal for all four performed lifting operations, that is, upwardly directed movement of the lifter twice, with and without $m_l$, and downwardly directed movement of the lifter twice, with and without $m_l$.

The piston area A is isolated as follows:

$$A = \frac{2 + \left[ \frac{m_{oo} - m_{ooz}}{2m_l + m_{co} - m_{coz}} \right] + \left[ \frac{m_{on} - m_{onz}}{2m_l + m_{cn} - m_{cnz}} \right]}{\left[ \frac{\frac{p_o - p_r}{g + 2a_o} - \frac{p_{oz} - p_{rz}}{g + 2a_{oz}}}{2m_l + m_{co} - m_{coz}} \right] + \left[ \frac{\frac{p_n - p_r}{g + 2a_n} - \frac{p_{nz} - p_{rz}}{g + 2a_{nz}}}{2m_l + m_{cn} - m_{cnz}} \right]} \quad (13)$$

Determination of Error $m_e$

Previously, in equation (3), an error for upwardly directed movement was imposed. The total error for upwardly and downwardly directed movement thus constitutes $$m_e = \frac{a_o \cdot \left[ \frac{m_{oo}}{1 + \mu} + m_{vo} \right]}{4 \cdot (g + 2a_o)} + \frac{a_n \cdot \left[ \frac{m_{on}}{1 + \mu} + m_{vn} \right]}{4 \cdot (g + 2a_n)} \quad (14)$$

As an example, the total error $m_e$, in case of the masses $m_{vo}$=100 kg, $m_{oo}$=2 kg and an acceleration $a_o$=0.1 m/s² as well as the masses $m_{vn}$=100 kg, $m_{on}$=2 kg and an acceleration $a_n$=−0.3 m/s² as well as the coefficient of friction μ=0.05, is $$m_e = \frac{0.1 \cdot \left[\frac{2}{1+0.05} + 100\right]}{4 \cdot (9.81 + 2 \cdot 0.1)} + \frac{-0.3 \cdot \left[\frac{2}{1-0.05} + 100\right]}{4 \cdot (9.81 + 2 \cdot (-0.3))}$$
$$= -0.58 [kg]$$

which for most purposes is negligible.

Determination of Coefficient of Friction μ

Rewriting equation (4) and (5) yields:

$$\left[\frac{(p_o - p_r) \cdot A}{g + 2a_o} - m_{oo} - m_{co} \cdot (1 + \mu)\right] = (2m_l + 2m_g + m_s + m_k) \cdot (1 + \mu)$$

$$\left[\frac{(p_n + p_r) \cdot A}{g + 2a_n} - m_{on} - m_{cn} \cdot (1 - \mu)\right] = (2m_l + 2m_g + m_s + m_k) \cdot (1 - \mu)$$

By equal velocity and equal load mass for upwardly and downwardly directed movement, either side of the second of the above two equations may be subtracted from either side of the first of the above two equations, respectively, thereby forming the numerator on either side of the following equation, and subsequently either side of the above two equations may be added, respectively, thereby forming the denominator on either side of the following equation:

$$\mu = \frac{\left[\frac{(p_o - p_r) \cdot A}{g + 2a_o} - m_{oo} - m_{co} \cdot (1 + \mu)\right] - \left[\frac{(p_n + p_r) \cdot A}{g + 2a_n} - m_{on} - m_{cn} \cdot (1 - \mu)\right]}{\left[\frac{(p_o - p_r) \cdot A}{g + 2a_o} - m_{oo} - m_{co} \cdot (1 + \mu)\right] + \left[\frac{(p_n + p_r) \cdot A}{g + 2a_n} - m_{on} - m_{cn} \cdot (1 - \mu)\right]}$$

whereby the coefficient of friction μ has been isolated by reduction on the left side of the equation.

If $m_{co}$=$m_{cn}$, then $m_{oo}$=$m_{on}$, and a simple equation is produced $$\left(A \cdot \left[\frac{p_o - p_r}{g + 2a_o} + \frac{p_n + p_r}{g + 2a_n}\right] - m_{oo} - m_{on}\right) \cdot \mu = A \cdot \left[\frac{p_o - p_r}{g + 2a_o} - \frac{p_n + p_r}{g + 2a_n}\right]$$

in which the solution for μ is $$\mu = \frac{\left[\frac{p_o - p_r}{g + 2a_o} - \frac{p_n + p_r}{g + 2a_n}\right]}{\left[\frac{p_o - p_r}{g + 2a_o} + \frac{p_n + p_r}{g + 2a_n}\right] - \frac{m_{oo} + m_{on}}{A}} \quad (16)$$

If $m_{co} \neq m_{cn}$, a quadratic equation is produced $$(m_{co} - m_{cn}) \cdot \mu^2 - \left(A \cdot \left[\frac{p_o - p_r}{g + 2a_o} + \frac{p_n + p_r}{g + 2a_n}\right] - (m_{oo} + m_{on})\right) \cdot \mu +$$
$$A \cdot \left[\frac{p_o - p_r}{g + 2a_o} - \frac{p_n + p_r}{g + 2a_n}\right] - (m_{oo} - m_{on}) - (m_{co} - m_{cn}) = 0$$

in which the solution for μ is $$\mu = \frac{\begin{array}{c} A \cdot \left[\frac{p_o - p_r}{g + 2a_o} + \frac{p_n + p_r}{g + 2a_n}\right] - (m_{oo} + m_{on}) - \\ \sqrt{\left(A \cdot \left[\frac{p_o - p_r}{g + 2a_o} + \frac{p_n + p_r}{g + 2a_n}\right] - (m_{oo} + m_{on})\right)^2 - 4(m_{co} - m_{cn}) \cdot} \\ \left(A \cdot \left[\frac{p_o - p_r}{g + 2a_o} + \frac{p_n + p_r}{g + 2a_n}\right] - (m_{oo} - m_{on}) - (m_{co} - m_{cn})\right) \end{array}}{(2 \cdot (m_{co} - m_{cn}))} \quad (17)$$

Alternative Method for Determining Load Mass $m_l$

The coefficient of friction μ is determined as previously by means of equation (16) or (17). μ is inserted in equation (18) below, which is a rewritten version of equation (2).

Inserting $F_o = (p_o - p_r) \cdot A - m_{oo} \cdot (g + a_o)$ in equation (2) produces $$m_{ho} = \frac{\frac{(p_o - p_r) \cdot A - m_{oo} \cdot (g + a_o)}{1 + \mu} - m_{vo} \cdot (g + a_o)}{2 \cdot (g + 2a_o)}$$

$$m_{ho} = \frac{\frac{(p_o - p_r) \cdot A}{1 + \mu} - \left(\frac{m_{oo}}{1 + \mu} + m_{vo}\right) \cdot (g + a_o)}{2 \cdot (g + 2a_o)}$$

Since $m_{ho} = m_l + m_g + m_{co}$ and $m_{vo} = m_s + m_{bo}$:

$$m_l + m_g + m_{co} = \frac{\frac{(p_o - p_r) \cdot A}{1 + \mu} - \left(\frac{m_{oo}}{1 + \mu} + m_s + m_{bo}\right) \cdot (g + a_o)}{2 \cdot (g + 2a_o)} \quad (18)$$

$$m_l = \frac{\frac{(p_o - p_r) \cdot A}{1 + \mu} - \left(\frac{m_{oo}}{1 + \mu} + m_s + m_{bo}\right) \cdot (g + a_o)}{2 \cdot (g + 2a_o)} - m_g - m_{co}$$

Correspondingly, for downwardly directed movement, the following equation is produced:

$$m_l = \frac{\frac{(p_n + p_r) \cdot A}{1 - \mu} - \left(\frac{m_{on}}{1 - \mu} + m_s + m_{bn}\right) \cdot (g + a_n)}{2 \cdot (g + 2a_n)} - m_g - m_{cn} \quad (19)$$

The Weighing Operation

The general embodiment consists in carrying out a weighing operation, in which a load is first lifted and subsequently lowered. By means of this weighing operation, measurements of pressure and flow are carried out, and at the end of the process the results are analysed and worked up in order to calculate the mass of the load. Position, velocity and acceleration of the hydraulic piston may be calculated from the measured flow.

Figure 7:
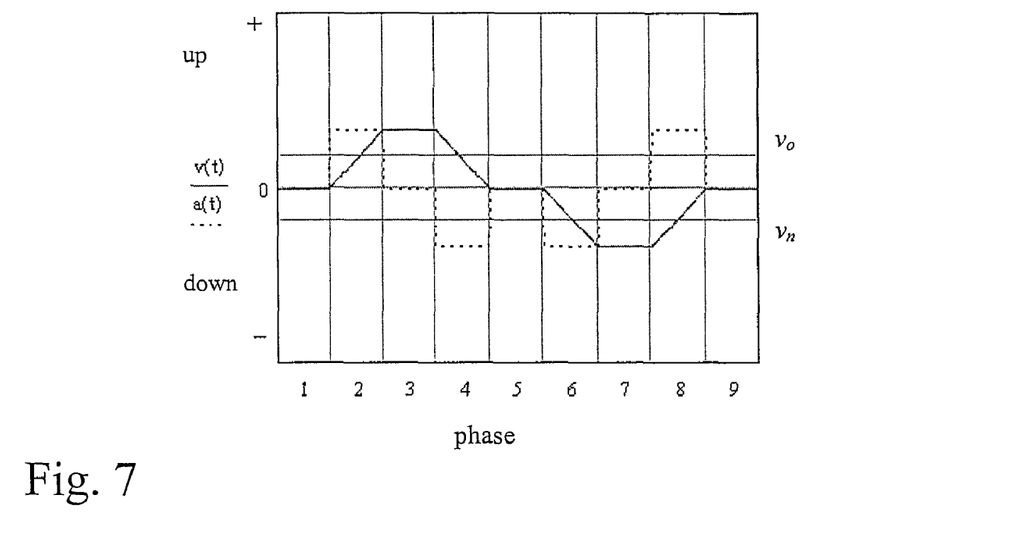
FIG. 7 illustrates lifting velocity and acceleration in a general embodiment of the weighing method.

As illustrated in FIG. 7 showing lifting velocity and acceleration, a weighing operation may be divided into nine phases from the beginning to the end:
Press "start"
1. v=0 and a=0
2. v>0 and a>0
3. v>0 and a=0
4. v>0 and a<0
5. v=0 and a=0
6. v<0 and a<0
7. v<0 and a=0
8. v<0 and a>0
9. calculate mass
"stop" weighing operation It should be noted that for illustration purposes, the acceleration is indicated as being constant within each phase; however, where velocity changes occur, the acceleration need not be constant; in fact, normally it will vary, because the lifter usually is manually controlled during weighing.

The weighing operation is initiated by pressing the "start" button, where after continuous measuring of hydraulic pressure p and flow Q as well as calculation of the piston position s, velocity v and acceleration a throughout most of the process (phase 1 to 8) is carried out. The calculations are carried out via the relations $$s = \frac{l \cdot r}{A}, v = \frac{l \cdot z}{A}, a = \frac{l \cdot n}{A}.$$

In the acceleration phases of both lifting and lowering, i.e. the phases 2, 4, 6 and 8, the values of p, s, v and a are stored. At the end of the weighing operation (phase 9), two approximately equal piston velocities $v_o$ and $v_n$ (see FIG. 7) are selected for lifting and lowering, respectively. These velocities are also related to piston positions, accelerations and hydraulic pressures, $s_o$, $a_o$, $p_o$, $s_n$, $a_n$, $p_n$ for lifting and lowering, respectively.

Via mathematical relations, $m_{co}=(c0-2 \cdot s_o) \cdot k$ and $m_{cn}=(c0-2 \cdot s_n) \cdot k$ are furthermore calculated, expressing the masses of the chain portion c, as well as $m_{oo}=s_o \cdot A \cdot \rho$ and $m_{on}=s_n \cdot A \cdot \rho$ equaling the masses of oil in the hydraulic cylinder at the two velocities $v_o$ and $v_n$. Finally, $p_r=|v| \cdot A \cdot d$ is calculated, given by combining the relations $p_r=|Q| \cdot d$, $Q=l \cdot z$ and $$v = \frac{l \cdot z}{A}.$$

If $m_{co} \neq m_{cn}$, the values $p_o$, $p_n$, $p_r$, $a_o$, $a_n$, $m_{co}$, $m_{cn}$, $m_{oo}$, and $m_{on}$ are inserted in equation (17), and then μ is calculated. If $m_{co}=m_{cn}$, said values are inserted in equation (16).

Given that the equivalent mass constant for the lifting device $m_a$ is known, the same values as above, as well as the calculated value of μ, are inserted in equation (7), whereby the weight of the load mass $m_l$ is calculated. It is noted, however, that if $m_{co}=m_{cn}$, the value of μ need not be calculated in this general embodiment, as μ is multiplied by $(m_{co}-m_{cn})=0$.

The result may be presented in a suitable manner, and the weighing operation may be completed (phase 9).

In an alternative embodiment for the determination of the load mass $m_l$, the coefficient of friction μ is determined as in the general embodiment described above, but it is subsequently inserted into the equation for either lifting, equation (18), or lowering, equation (19), in order to calculate the weight.

In another embodiment for the determination of the load mass $m_l$, the weighing operation is initiated by pressing the "start" button, where after continuous measuring of hydraulic pressure p and flow Q as well as calculation of piston position s, velocity v and acceleration a throughout most of the process (phase 1 to 8) is carried out.

Figure 8:
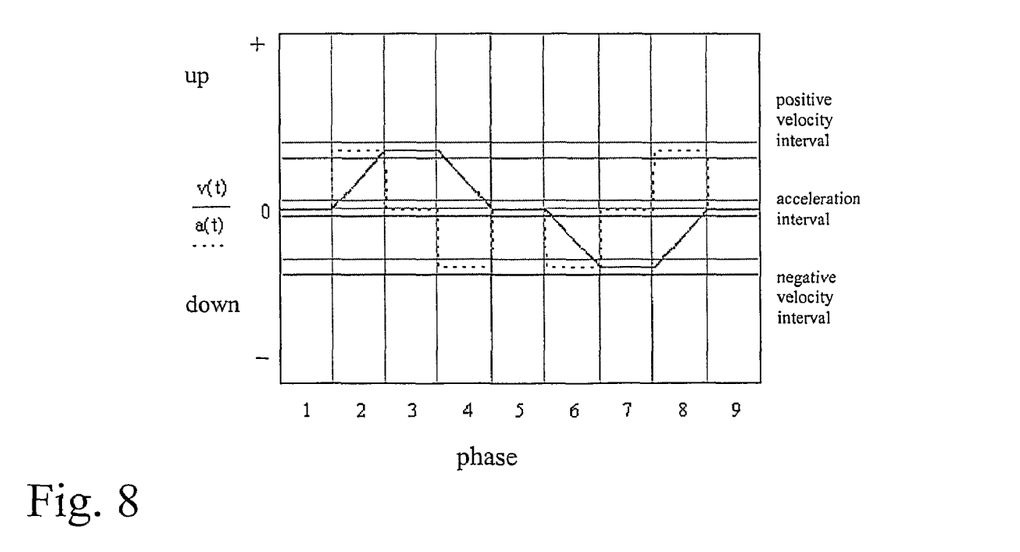
FIG. 8 illustrates lifting velocity and acceleration in another embodiment of the weighing method.
Figure 9:
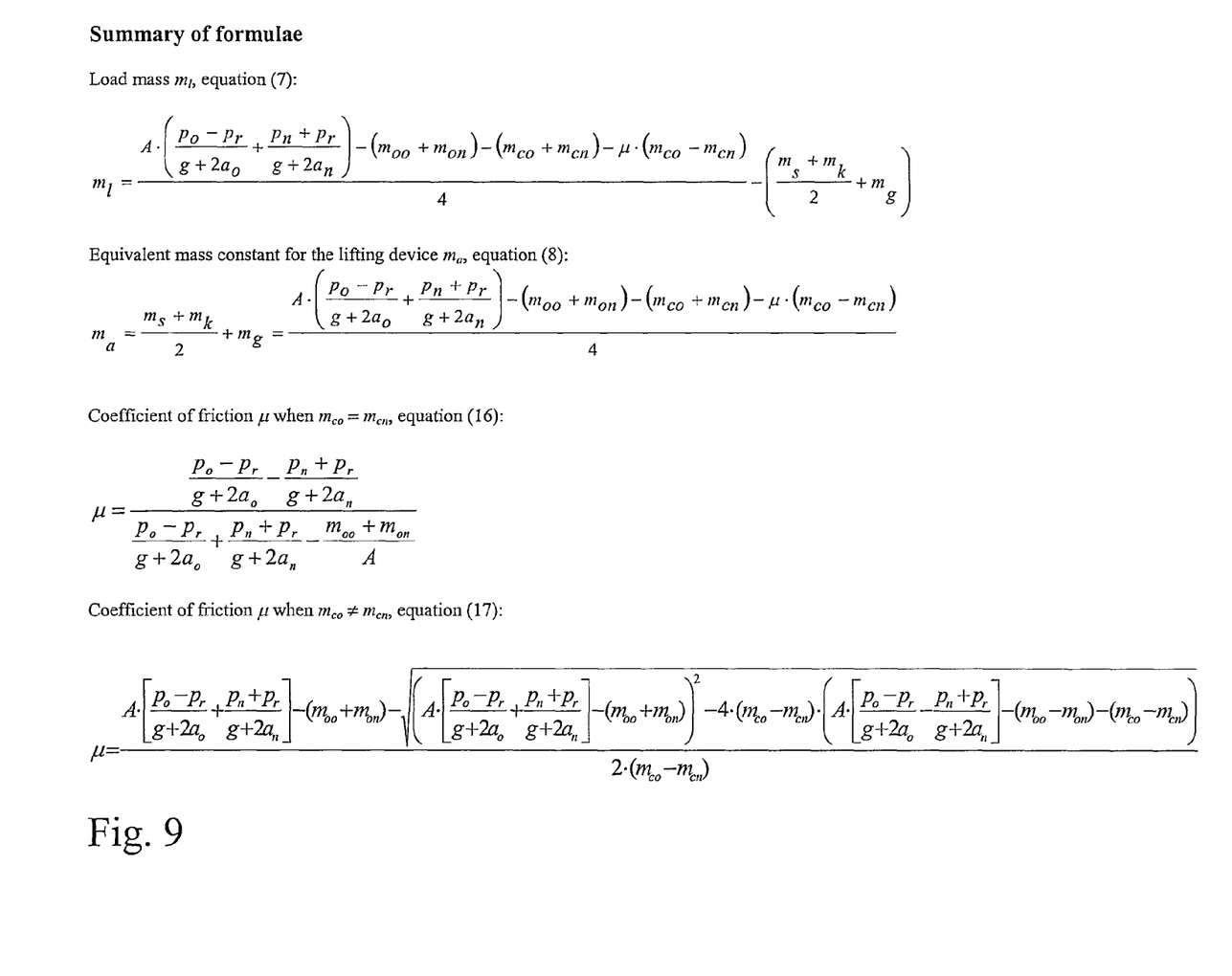
FIGS. 9 and 10 show a summary of formulae.
Figure 10:
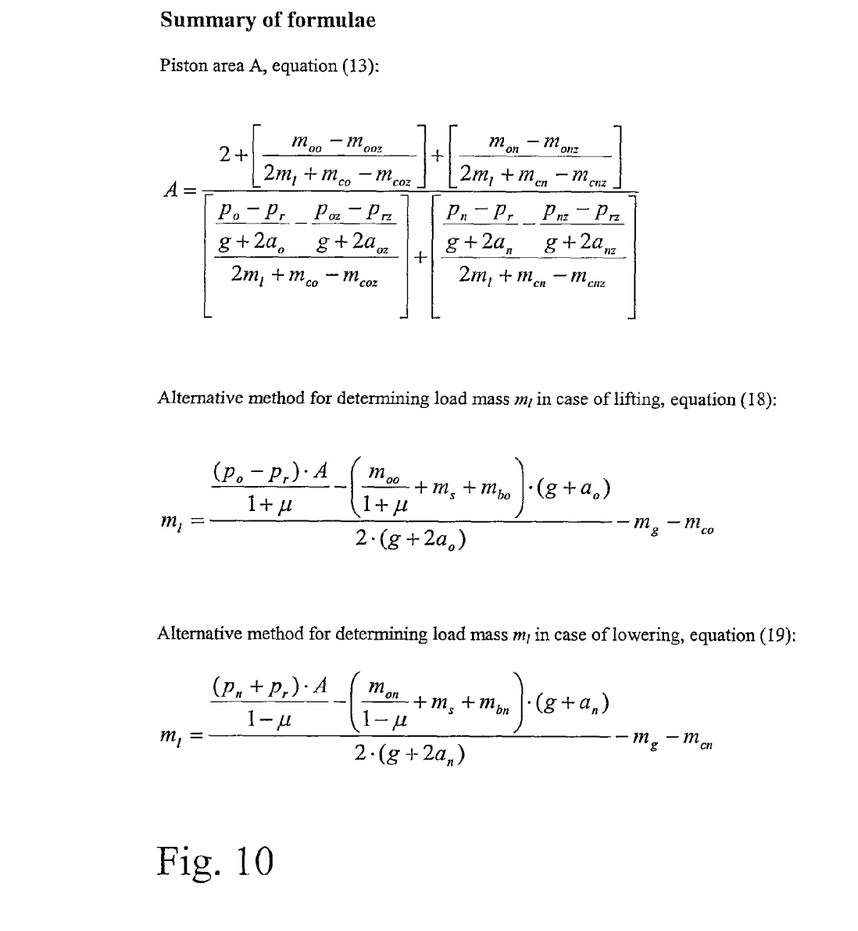

In the case of lifting, the user is guided via a visual indicator of the output device 26 into a predetermined velocity interval (see FIG. 8). When the lifting velocity is within this interval and the acceleration is smaller than a given maximum value (acceleration interval in FIG. 8), and a minimum number of measurements, for instance 10, fulfilling these criteria have been found and stored, the user will be notified visually and acoustically in order to complete the lifting operation so that the lowering can begin.

In the case of lowering, the user is also guided into the same velocity interval, and when the acceleration is smaller than the same maximum value as in the case of lifting, and a corresponding number of measurements fulfilling these criteria have been found and stored, the user will be notified visually and acoustically in order to complete the lowering.

This means that a number of measurements for p, s, v and a have now been selected and stored for both lifting in phase 3 and lowering in phase 7. In phase 9, the mass of the load is calculated and the weighing operation is terminated.

The calculations are carried out according to one of the methods in the above described embodiments, the difference being that $s_o$, $v_o$, $a_o$, $p_o$ and $s_n$, $v_n$, $a_n$, $p_n$ are mean values of the stored measurements for lifting and lowering, respectively.

FURTHER EMBODIMENTS

Although the weight determination in the above described embodiments is carried out by means of a computer, parts of or the entire weight determination may be performed by other means, for instance by means of traditional control circuits. In this connection, the described determination of an acceleration dependent parameter should be construed in a broad sense; apart from being a value determined in a computer programme, it may for instance be in the form of the generation of an acceleration dependent electric signal in an electric control circuit, or it may even be integrated in the function of a component of such control circuit.

In the fork-lift truck shown in FIG. 1, the lifter 1 may further be arranged pivotally about a horizontal axis. The tilt angle of the lifter 1 may then be registered in the computer by means of a transducer and taken into account by the weight determination. Similarly, a tilt angle of the entire fork-lift truck in relation to a horizontal plane may be registered and taken into account by the weight determination. Furthermore, although the weighing device according to the invention in the above is described for use in a certain well-known type of forklift truck, the skilled person will understand that the described weighing device may be modified for use in other types of fork-lift truck. The equations given above are suitable for the shown device, but they may be modified for use in different devices according to the principles explained above.

Although the equations given above, apart from forces resulting from accelerations, also take into account additional forces resulting from the position of the lifter, that is, the weight distribution of the elements of the lifting device and the load, and forces resulting from the velocity of such elements and the lifter, such as loss of head by friction in the pipe between the pressure transducer and the hydraulic cylinder, such additional forces may be let out of the calculations, insofar that contributions from such forces may be neglected for the actual purpose. For instance, it may be assumed that the viscous frictions by upward and downward displacement of the lifter are equal, although there may be difference in the velocities of the lifter by the upward and downward displacement. Similarly, the weight distribution of elements such as the chain may be assumed to be constant. The skilled person will understand how to construct adequate equations for the weight determination in such cases on the basis of the principles given above. Possibly, equations obtained in this way may be simpler than those given above.

The invention claimed is:

1. A method of weight determination of a load carried by a lifter of a lifting device, whereby the weight determination is based on at least one upward and one downward displacement of the lifter, whereby the lifter is displaced by means of a hydraulic actuator comprised by a hydraulic system, whereby, during the upward and downward displacement of the lifter, a pressure in the hydraulic system is measured by means of a pressure transducer, thereby providing a pressure signal, and a parameter dependent on the position of the lifter is measured by means of a meter, thereby providing a position signal, and whereby the weight of the load is determined on the basis of the pressure signal and the position signal, wherein the position signal is registered as a function of time, an acceleration dependent parameter is determined on the basis of the variation of the position signal, and the weight determination is performed in dependence of said acceleration dependent parameter.

2. A method of weight determination according to claim 1, wherein the pressure signal is registered as a function of time, a velocity dependent parameter is determined as a function of time on the basis of the variation of the position signal, a point in time during the upward displacement of the lifter is selected, and a point in time during the downward displacement of the lifter is selected, so that the values of the velocity dependent parameter to the respective selected points in time are substantially equal, and the weight determination is performed in dependence of the values of the pressure signal registered to the respective selected points in time and in dependence of the values of the acceleration dependent parameter determined for the respective selected points in time.

3. A method of weight determination according to claim 2, wherein the weight determination is performed in dependence of the values of the position signal registered to the respective selected points in time.

4. A method of weight determination according to claim 2, wherein the weight determination is performed in dependence of the values of the velocity dependent parameter determined for the respective selected points in time.

5. A method of weight determination according to claim 1, wherein, during one upward and one downward displacement of the lifter, the velocity and the acceleration of the lifter are determined on the basis of the variation of the position signal and presented to a user in real time via an output device, the user by means of a hydraulic valve operates the lifter to maintain the velocity substantially within a certain range and the acceleration substantially below a certain limit, two periods of time during said one upward and said one downward displacement of the lifter, respectively, are determined, during which periods of time the determined velocity is within said range, and the determined acceleration is below said limit, and the weight of the load is determined on the basis of average values of the acceleration and pressure signals during said periods of time, respectively.

6. A method of weight determination according to claim 5, wherein the weight of the load is determined on the basis of average values of the position and velocity signals during said periods of time, respectively.

7. A method of weight determination according to claim 1, wherein a general coefficient of friction of the lifting device is determined on the basis of one upward and one downward displacement of the lifter carrying the load to be weighed, and the weight determination is based on the determined general coefficient of friction.

8. A method of weight determination according to claim 1, wherein the position signal is provided by means of a flowmeter measuring the flow of hydraulic fluid through a pipe for the hydraulic actuator.

9. A method of weight determination according to claim 1, wherein signals from the pressure transducer and from the meter providing the parameter dependent on the position of the lifter are registered as sampled values in a computer, and the computer calculates the position signal and the pressure signal on the basis thereof and determines the weight of the load on the basis thereof.

10. A method of weight determination according to claim 1, wherein a weighing operation is automatically performed by means of a processor upon initiation by the user, whereby the hydraulic actuator is controlled by the processor to displace the lifter once in upward direction and once in downward direction.

11. A weighing device for weight determination of a load carried by a lifter of a lifting device, the lifter being displaceable by means of a hydraulic actuator comprised by a hydraulic system of the lifting device, the weighing device comprising a processor adapted to determine the weight on the basis of at least one upward and one downward displacement of the lifter, a pressure transducer adapted to measure a pressure in the hydraulic system of the lifting device and thereby provide a pressure signal, and a meter adapted to measure a parameter dependent on the position of the lifter of the lifting device and thereby provide a position signal, and the processor being adapted to determine the weight of the load on the basis of a pressure signal and a position signal supplied from the pressure transducer and the meter, respectively, during the upward and downward displacement of the lifter, wherein the processor is adapted to register the position signal as a function of time, to determine an acceleration dependent parameter on the basis of the variation of the position signal, and to determine the weight in dependence of said acceleration dependent parameter.

12. A weighing device according to claim 11, wherein the processor is adapted to register the pressure signal as a function of time, to determine a velocity dependent parameter as a function of time on the basis of the variation of the position signal, to select a point in time during the upward displacement of the lifter and select a point in time during the downward displacement of the lifter, so that the values of the velocity dependent parameter to the respective selected points in time are substantially equal, and to perform the weight determination in dependence of the values of the pressure signal registered to the respective selected points in time and in dependence of the values of the acceleration dependent parameter determined for the respective selected points in time.

13. A weighing device according to claim 12, wherein the processor is adapted to perform the weight determination in dependence of the values of the position signal registered to the respective selected points in time.

14. A weighing device according to claim 12, wherein the processor is adapted to perform the weight determination in dependence of the values of the velocity dependent parameter determined for the respective selected points in time.

15. A weighing device according to claim 11, wherein the processor is adapted to determine, during one upward and one downward displacement of the lifter, the velocity and the acceleration of the lifter on the basis of the position signal, the weighing device comprises an output device adapted to present the determined velocity and acceleration to a user in real time, the processor is adapted to guide the user, via the output device, to operate the lifter to maintain the velocity substantially within a certain range and the acceleration substantially below a certain limit, the processor is adapted to determine two periods of time during said one upward and said one downward displacement of the lifter, respectively, during which periods of time the determined velocity is within said range, and the determined acceleration is below said limit, and the processor is adapted to determine the weight of the load on the basis of average values of the acceleration and pressure signals during said periods of time, respectively.

16. A weighing device according to claim 15, wherein the processor is adapted to determine the weight of the load on the basis of average values of the position and velocity signals during said periods of time, respectively.

17. A weighing device according to claim 11, wherein the processor is adapted to determine a general coefficient of friction of the lifting device on the basis of one upward and one downward displacement of the lifter carrying the load to be weighed, and to determine the weight on the basis of the determined general coefficient of friction.

18. A weighing device according to claim 11, wherein a flowmeter is provided to measure the flow of hydraulic fluid through a pipe for the hydraulic actuator and thereby provide the position signal.

19. A weighing device according to claim 18, wherein the weighing device comprises a unit having a through-going tube part adapted to be fitted in-line in the pipe for the hydraulic actuator of the lifting device, and the flowmeter and the pressure transducer are integrated in the unit and arranged to measure the flow through and the pressure in, respectively, the tube part.

20. A weighing device according to claim any one of the claims 11, wherein the processor is a computer adapted to register, as sampled values, signals from the pressure transducer and from the meter providing the parameter dependent on the position of the lifter, and the computer is adapted to calculate the position signal and the pressure signal on the basis of the registered signals from the pressure transducer and from the meter and to determine the weight of the load on the basis thereof.

21. A weighing device according to claim any one of the claims 11, wherein the processor is adapted to automatically perform a weighing operation upon initiation by the user, whereby the hydraulic actuator is controlled by means of the processor to displace the lifter once in upward direction and once in downward direction.

22. A lifting device comprising a weighing device according to claim 11.

23. A lifting device according to claim 22, wherein the lifting device is a fork-lift truck.

\* \* \* \* \*